UNITED STATES PATENT OFFICE.

R JAY FOSTER, OF CEREAL, PENNSYLVANIA, ASSIGNOR TO JERSEY CEREAL FOOD COMPANY, OF CEREAL, PENNSYLVANIA, A CORPORATION OF PENNSYLVANIA.

CEREAL FOOD.

1,211,126.　　　Specification of Letters Patent.　　Patented Jan. 2, 1917.

No Drawing.　　Application filed October 5, 1916. Serial No. 123,870.

*To all whom it may concern:*

Be it known that I, R JAY FOSTER, a citizen of the United States, and a resident of Cereal, in the county of Westmoreland and State of Pennsylvania, have invented certain new and useful Improvements in Cereal Foods, of which the following is a specification.

This invention relates to an uncooked cereal food of which bran is a constituent, the food containing all the bran of the grain forming the basis of such food and an added portion of bran.

In the preferred practice, the permanency of the mixture is assured by employing a binder in the form of glutenous flour which causes the bran to adhere to the crushed or flaked grain, and also adds nutriment to the mixture. The invention is, however, not limited in this regard as it contemplates the employment of any suitable means or manipulation for maintaining the essential elements in a thoroughly mixed state, as for instance by developing an adherence between the elements from the basic grain, or from the bran, without introducing a distinct binder ingredient. The well known laxative properties of bran are thus availed of in a nutritious food that is very palatable when cooked in the usual manner of preparing oatmeal and similar cereal foods.

While the basic whole-grain element may be wheat, oats, barley, or rye, wheat is preferably used. The grain is softened by dampening with water or steam and thereby so toughened that it may be crushed into flake form without powdering. The toughened grain is mixed with bran, and a binder is preferably utilized which causes the bran to adhere to the grain. Various brans may be used, though wheat-bran is preferred, and a desirable binder is a glutenous flour which is rendered active by dampening the whole grain, the dampening incident to toughening the latter being available, or if the grain is dried after being toughened, it may be again moistened. The moist grain, the bran and the flour are thoroughly mixed, and the mixture is passed between rolls which flakes the toughened grain without separating it from the adhering bran, and the rolled product is then dried in any suitable manner to remove excess moisture which puts it in condition for packing or for use. The elements remain thoroughly mixed due to the adherence of the bran to the flaked grain, there being no tendency to separate in the cartons or other packages due to the crushed or flaked grain being heavier than the bran.

While the elements constituting the food may be used in various proportions, a desirable formula with wheat as a basis consists of approximately seven parts whole wheat crushed, three parts bran in addition to the bran of the crushed wheat, and three parts glutenous flour.

The improved food is "uncooked" in the sense that it must be cooked, or at least subjected to heat by the consumer before it is in condition to be eaten. The invention does not, however, preclude a preliminary or partial cooking of one or more of the elements preceding or during the process of manufacturing the food. Partial cooking may result if the basic grain is toughened by steaming, or from the application of heat when drying the mixture following the grain crushing process.

I claim:

1. A process of manufacturing an uncooked cereal food, consisting in mixing bran with whole grain, and then crushing the grain.

2. A process of manufacturing an uncooked cereal food, consisting in mixing bran and whole grain with a binder which causes the bran to adhere to the grain, and then crushing the grain.

3. A process of manufacturing an uncooked cereal food, consisting in mixing damp whole grain with bran and glutenous flour, and then crushing the grain.

4. A process of manufacturing an uncooked cereal food, consisting in toughening whole grain for flaking, mixing the toughened grain, while damp, with bran and glutenous flour, and subjecting the mixture to crushing pressure which flakes the grain.

5. An uncooked cereal food consisting of crushed whole grain which includes all of the bran of such grain, and an added portion of bran.

6. An uncooked cereal food consisting of crushed whole grain which includes all of the bran of such grain, and an added portion of bran adhering to and thereby permanently mixed with the crushed grain.

7. An uncooked cereal food consisting of whole grain in crushed state, bran, and a binder.

8. An uncooked cereal food consisting of whole grain in crushed state, bran, and glutenous flour uniting the flaked grain and bran.

9. An uncooked cereal food consisting of crushed whole wheat which includes all of the bran of such wheat, and an added portion of bran.

10. An uncooked cereal food consisting of whole wheat in crushed state, bran, and a binder.

11. An uncooked cereal food consisting of whole wheat in crushed state, bran, and glutenous flour uniting the flaked wheat and bran.

12. An uncooked cereal food consisting of whole wheat in crushed state about seven parts, bran about three parts, and glutenous flour about three parts.

In testimony whereof, I affix my signature in presence of two witnesses.

R JAY FOSTER.

Witnesses:
J. M. NESBIT,
ALICE B. DICE.